United States Patent
Fallman et al.

(10) Patent No.: US 12,458,739 B2
(45) Date of Patent: Nov. 4, 2025

(54) PERITONEAL DIALYSIS SYSTEM HAVING AIR-AIDED PUMPING SEQUENCES

(71) Applicants: BAXTER INTERNATIONAL INC., Deerfield, IL (US); BAXTER HEALTHCARE SA, Glattpark (CH)

(72) Inventors: Oskar Erik Frode Styrbjorn Fallman, Lund (SE); Bjorn Ericson, Lund (SE); Olof Christer Jansson, Vellinge (SE)

(73) Assignees: BAXTER INTERNATIONAL INC., Deerfield, IL (US); BAXTER HEALTHCARE SA, Glattpark (CH)

( * ) Notice: Subject to any disclaimer, the term of this patent is extended or adjusted under 35 U.S.C. 154(b) by 442 days.

(21) Appl. No.: 18/147,060

(22) Filed: Dec. 28, 2022

(65) Prior Publication Data

US 2023/0201441 A1 Jun. 29, 2023

Related U.S. Application Data

(60) Provisional application No. 63/294,259, filed on Dec. 28, 2021.

(51) Int. Cl.
*A61M 1/28* (2006.01)
*A61M 1/16* (2006.01)
*A61M 1/36* (2006.01)

(52) U.S. Cl.
CPC .......... *A61M 1/282* (2014.02); *A61M 1/1682* (2014.02); *A61M 1/285* (2013.01); *A61M 1/287* (2013.01); *A61M 1/3638* (2014.02); *A61M 2205/75* (2013.01)

(58) Field of Classification Search
CPC ...... A61M 1/1682; A61M 1/28; A61M 1/282; A61M 1/285; A61M 1/287; A61M 1/288; A61M 1/3638; A61M 2205/75; A61M 2205/11

See application file for complete search history.

(56) References Cited

U.S. PATENT DOCUMENTS

2005/0209563 A1   9/2005   Hopping et al.

FOREIGN PATENT DOCUMENTS

WO   2021/156429 A1   8/2021

OTHER PUBLICATIONS

International Preliminary Report on Patentability and Written Opinion of the International Searching Authority for International Patent Application No. PCT/US2022/082450 dated Jun. 20, 2024.

*Primary Examiner* — John Kim
(74) *Attorney, Agent, or Firm* — K&L Gates LLP (57) ABSTRACT

A peritoneal dialysis ("PD") system having an air-aided pumping sequence is disclosed herein. In an example, a PD system includes a housing, a PD fluid pump housed by the housing, an airtrap, a fluid line extending from the airtrap, a fluid line valve positioned and arranged to operate with the fluid line, a gas line extending from an upper portion of the airtrap, and a gas line valve positioned and arranged to operate with the gas line. The system also includes a control unit configured to cause the fluid line valve to close, the gas line valve to open, and the PD fluid pump to pump gas from the airtrap into the gas line after a patient drain to create a pocket of gas in the fluid line and push residual used PD fluid towards a drain line.

14 Claims, 2 Drawing Sheets

PERITONEAL DIALYSIS SYSTEM HAVING AIR-AIDED PUMPING SEQUENCES

PRIORITY CLAIM

This application claims priority to and the benefit as a non-provisional application of U.S. Provisional Patent Application No. 63/294,259 filed Dec. 28, 2021, the entire contents of which are hereby incorporated by reference and relied upon.

BACKGROUND

The present disclosure relates generally to medical fluid treatments and in particular to dialysis fluid treatments.

Due to various causes, a person's renal system can fail. Renal failure produces several physiological derangements. It is no longer possible to balance water and minerals or to excrete daily metabolic load. Toxic end products of metabolism, such as, urea, creatinine, uric acid and others, may accumulate in a patient's blood and tissue.

Reduced kidney function and, above all, kidney failure is treated with dialysis. Dialysis removes waste, toxins and excess water from the body that normal functioning kidneys would otherwise remove. Dialysis treatment for replacement of kidney functions is critical to many people because the treatment is lifesaving.

One type of kidney failure therapy is Hemodialysis ("HD"), which in general uses diffusion to remove waste products from a patient's blood. A diffusive gradient occurs across the semi-permeable dialyzer between the blood and an electrolyte solution called dialysate or dialysis fluid to cause diffusion.

Hemofiltration ("HF") is an alternative renal replacement therapy that relies on a convective transport of toxins from the patient's blood. HF is accomplished by adding substitution or replacement fluid to the extracorporeal circuit during treatment. The substitution fluid and the fluid accumulated by the patient in between treatments is ultrafiltered over the course of the HF treatment, providing a convective transport mechanism that is particularly beneficial in removing middle and large molecules.

Hemodiafiltration ("HDF") is a treatment modality that combines convective and diffusive clearances. HDF uses dialysis fluid flowing through a dialyzer, similar to standard hemodialysis, to provide diffusive clearance. In addition, substitution solution is provided directly to the extracorporeal circuit, providing convective clearance.

Most HD, HF, and HDF treatments occur in centers. A trend towards home hemodialysis ("HHD") exists today in part because HHD can be performed daily, offering therapeutic benefits over in-center hemodialysis treatments, which occur typically bi- or tri-weekly. Studies have shown that more frequent treatments remove more toxins and waste products and render less interdialytic fluid overload than a patient receiving less frequent but perhaps longer treatments. A patient receiving more frequent treatments does not experience as much of a down cycle (swings in fluids and toxins) as does an in-center patient, who has built-up two or three days' worth of toxins prior to a treatment. In certain areas, the closest dialysis center can be many miles from the patient's home, causing door-to-door treatment time to consume a large portion of the day. Treatments in centers close to the patient's home may also consume a large portion of the patient's day. HHD can take place overnight or during the day while the patient relaxes, works or is otherwise productive.

Another type of kidney failure therapy is peritoneal dialysis ("PD"), which infuses a dialysis solution, also called dialysis fluid, into a patient's peritoneal chamber via a catheter. The dialysis fluid is in contact with the peritoneal membrane in the patient's peritoneal chamber. Waste, toxins and excess water pass from the patient's bloodstream, through the capillaries in the peritoneal membrane, and into the dialysis fluid due to diffusion and osmosis, i.e., an osmotic gradient occurs across the membrane. An osmotic agent in the PD dialysis fluid provides the osmotic gradient. Used or spent dialysis fluid is drained from the patient, removing waste, toxins and excess water from the patient. This cycle is repeated, e.g., multiple times.

There are various types of peritoneal dialysis therapies, including continuous ambulatory peritoneal dialysis ("CAPD"), automated peritoneal dialysis ("APD"), tidal flow dialysis and continuous flow peritoneal dialysis ("CFPD"). CAPD is a manual dialysis treatment. Here, the patient manually connects an implanted catheter to a drain to allow used or spent dialysis fluid to drain from the peritoneal chamber. The patient then switches fluid communication so that the patient catheter communicates with a bag of fresh dialysis fluid to infuse the fresh dialysis fluid through the catheter and into the patient. The patient disconnects the catheter from the fresh dialysis fluid bag and allows the dialysis fluid to dwell within the peritoneal chamber, wherein the transfer of waste, toxins and excess water takes place. After a dwell period, the patient repeats the manual dialysis procedure, for example, four times per day. Manual peritoneal dialysis requires a significant amount of time and effort from the patient, leaving ample room for improvement.

Automated peritoneal dialysis ("APD") is similar to CAPD in that the dialysis treatment includes drain, fill and dwell cycles. APD machines, however, perform the cycles automatically, typically while the patient sleeps. APD machines free patients from having to manually perform the treatment cycles and from having to transport supplies during the day. APD machines connect fluidly to an implanted catheter, to a source or bag of fresh dialysis fluid and to a fluid drain. APD machines pump fresh dialysis fluid from a dialysis fluid source, through the catheter and into the patient's peritoneal chamber. APD machines also allow for the dialysis fluid to dwell within the chamber and for the transfer of waste, toxins and excess water to take place. The source may include multiple liters of dialysis fluid including several solution bags.

APD machines pump used or spent dialysate from the patient's peritoneal cavity, though the catheter, to drain. As with the manual process, several drain, fill and dwell cycles occur during dialysis. A "last fill" may occur at the end of the APD treatment. The last fill fluid may remain in the peritoneal chamber of the patient until the start of the next treatment, or may be manually emptied at some point during the day.

In any of the above modalities using an automated machine, the automated machine operates typically with a disposable set, which is discarded after a single use. Depending on the complexity of the disposable set, the cost of using one set per day may become significant. Also, daily disposables require space for storage, which can become a nuisance for home owners and businesses. Moreover, daily disposable replacement requires daily setup time and effort by the patient or caregiver at home or at a clinic.

For each of the above reasons, it is desirable to provide an APD machine that reduces disposable waste. In doing so, to the extent that disposable items are eliminated and flowpaths are reused, it is desirable to maintain those flowpaths as best as possible. A need for an improved reusable or durable PD fluid system is needed accordingly.

SUMMARY

Known automated peritoneal dialysis ("PD") systems typically include a machine or cycler that accepts and actuates a pumping cassette having a hard part and a soft part that is deformable for performing pumping and valving operations. The hard part is attached to tubes that extend to various bags. The disposable cassette and associated tubes and bags can be cumbersome for a patient at home to load for treatment. The overall amount of disposable items may also lead to multiple setup procedures requiring input from the patient, which can expose room for error.

The APD system and associated methodology of the present disclosure, on the other hand, convert much of the fluid carrying portions of its PD system into reusable components, which are disinfected after treatment. Fluid lines within the machine or cycler are reused. Disposable items remaining may include a drain line leading to a drain bag or house drain and one or more PD fluid container or bag, such as different dextrose or glucose level PD fluid containers and a last bag container, e.g., containing icodextrine. In an embodiment, a disposable filter is placed at the distal end of the patient line to provide a final stage of PD fluid filtration prior to delivery to the patient.

The APD system of the present disclosure incudes an APD cycler having a housing. At least one and perhaps three or more reusable PD fluid lines extend from the housing. When not connected to PD fluid containers or bags, the reusable PD fluid lines can be connected to disinfection connectors supported and provided by the housing. The reusable PD fluid lines may for example extend from a front of the housing and connect to disinfection connectors also provided at the front of the housing for ready access to the PD fluid lines. The reusable PD fluid lines may be color coded and/or keyed to match a colored or keyed connector of the PD fluid container or bag. The containers or bags may hold different dextrose or glucose level PD fluids, such as 1.36% glucose PD fluid, 2.27% glucose PD fluid and/or a last bag of a different formulation of PD fluid, such as icodextrin.

Inside the housing, reusable tubing runs from each of the reusable PD fluid lines, through a PD fluid line valve for each PD fluid line, to a PD fluid inline heater. In an embodiment, each of the valves of the APD cycler is an electrically actuated valve having a reusable valve body that occludes (e.g., when unpowered) or allows (e.g., when powered) PD fluid to flow through the body. The PD fluid inline heater is also electrically actuated in one embodiment and is, for example, a resistive heater having a reusable heater body that accepts PD fluid for heating. The inline heater in an embodiment is able to heat PD fluid from room temperature to body temperature, e.g., 37° C., at a flowrate of at least 200 milliliters ("ml")/minute. A temperature sensor is located adjacent to the heater, e.g., downstream from the heater to provide feedback for temperature control.

Reusable tubing runs from the outlet of the PD fluid inline heater to an airtrap in one embodiment. Any of the tubing inside the housing of the cycler may be metal, e.g., stainless steel, or plastic, e.g., polyvinylchloride ("PVC") or a non-PVC material, such as polyethylene ("PE"), polyurethane ("PU"), polycarbonate ("PC") or polyether ether ketone ("PEEK"). In an embodiment, one or more level sensor is located adjacent the airtrap so that a desired level or range of levels of PD fluid is/are maintained in the airtrap. A fluid line valve is located along a reusable fluid line downstream from the airtrap in an embodiment and operates in cooperation with a gas line valve located along a gas line as discussed herein. The airtrap may be closed upstream by PD fluid line valves to drain the airtrap when dictated by the output of the level sensors.

A reusable PD fluid pump is located within the cycler housing and includes a reusable pump body that accepts PD fluid for pumping. That is, the pump does not require the PD fluid to flow within a disposable item, such as a tube or cassette. The PD fluid pump may be an electrically operated piston pump, which is inherently accurate so that a separate PD fluid volume measurement apparatus, such as a balance chamber or an apparatus using the ideal gas law, is not needed. The PD fluid pump may alternatively be an electrically operated, gear or centrifugal pump, which may operate with a separate PD fluid volume measurement apparatus.

The PD fluid pump is controllable to pump to and from the patient at or below a pressure limit by controlling a level of current to the PD fluid pump. A positive patient pressure limit may for example be one to five psig (e.g., two psig (14 kPa)). A negative patient pressure limit may for example be −1.0 psig to −3.0 psig (e.g., −1.3 psig (31 9 kPa)). The PD fluid pump is bidirectional and continuous in one embodiment, such that a single pump may be provided.

The APD cycler of the APD system of the present disclosure includes a control unit having one or more processor and one or more memory that receive signals or outputs from pressure sensors, temperature sensors and possibly a conductivity sensor and process the signals or outputs as feedback. The control unit uses pressure feedback to control the PD fluid pump to run at safe patient pressure limits during treatment and safe system limits during disinfection. The control unit uses temperature feedback to control the PD fluid heater to heat the fresh PD fluid to, e.g., body temperature.

The control unit also opens and closes the PD fluid valves in combination with the PD fluid pump and heater to run a priming sequence, a patient fill sequence, a patient drain sequence and a disinfection sequence after a PD treatment, wherein each of the at least one reusable PD fluid line is connected to one of the at least one disinfection connectors, and wherein the reusable patient line is connected to the reusable patient line connector. The disinfection sequence readies the APD cycler for the next treatment. In an embodiment, unused, fresh PD fluid is heated after the final drain and is used for disinfection.

In an embodiment, the control unit after a patient drain has been completed causes the gas line valve to open, the fluid line valve to close and the PD fluid pump 70 to pull a small amount (e.g., 0.5 ml or more) of air, or whatever gas (or mixture) resides at the top of the airtrap, from the top of airtrap. The PD fluid pump may be operated for one or more pump stroke(s) to pull the desired volume of gas. The Control unit also causes a drain line valve to open and for the PD fluid pump to push the air bubble through the reusable fluid line towards a drain line connector. The moving bubble causes residual effluent or drain fluid from a prior patient drain to be pushed towards the drain line connector and the house or container drain.

It is contemplated for the control unit to open one or more PD fluid line valve to allow a like volume of fresh PD fluid to enter the airtrap while the air pocket is removed from the airtrap so as not to create a negative pressure in the airtrap. It is also contemplated for the control unit to monitor the output from an upper level sensor to ensure that no fresh PD fluid is pulled from the airtrap into the gas line. If air is detected at the upper level sensor while an ongoing air pocket formation is taking place, the control unit in an embodiment causes the gas line valve to close and the PD fluid pump to stop.

After the formation and introduction of the gas pocket, the control unit causes the gas line valve to close, the fluid line valve to open, and one or more PD fluid supply line valve to open (if not already open), and causes the PD fluid pump to push the gas pocket towards the drain line connector, thereby pushing residual effluent or used PD fluid into drain line 36 and house or container drain. Here, fresh PD fluid is located upstream of the gas pocket, while residual used PD fluid or effluent is located downstream from gas pocket. It is contemplated for the control unit to cause the PD fluid pump to pump the fresh PD fluid pushing gas pocket 68 at a slow speed to create a laminar fluid flow that tends not to disrupt the formation of the gas pocket.

In an alternative embodiment for the system of the present disclosure, a filtered air vent is added that allows air to be pulled in from the atmosphere and potentially allows unwanted gases (e.g., $CO_2$, air or a mixture thereof) to be vented to atmosphere. The filtered air vent in an embodiment includes a hydrophobic filter membrane, e.g., a 0.2 micron filter, configured to sterile filter any ambient air entering through the filtered air vent.

The filtered air vent is used over multiple treatments, e.g., replaced on a service interval, such that it presents more of a microbial risk than a filter membrane associated with a patient line disposable filter set discussed herein. It is accordingly contemplated to communicate a vent line leading to leading to the filtered air vent with a fluid location of the system that is not part of the patient circuit during treatment, either for a patient fill or a patient drain. The system of the present disclosure provides multiple possible locations, namely, bypass lines that extend between disinfection connectors. The bypass lines as illustrated and discussed below are isolated during treatment and have no possible fluidic connection to the patient.

It is not until disinfection between PD treatments occurs that the bypass lines are brought into a disinfection loop by the connection of the distal ends of the reusable PD fluid supply lines in a fluid-tight manner with disinfection connectors located at the PD machine or cycler housing (to which the bypass lines are fluidly connected). Here, any pathogens that could possibly breach the filter membrane of the filtered air vent are killed via the disinfection procedure. It is contemplated for the control unit of the present system to open and sequence the machine valves as necessary and to cause the PD fluid pump to pull filtered air in through the filtered air vent, e.g., at the end of the disinfection sequence to drive the disinfection fluid to drain. Such air could be heated by the inline heater to help dry the disinfected reusable tubing of the cycler. The control unit may alternatively or additionally be used to open and sequence the valves as necessary and to cause the PD fluid pump to push gases formed during disinfection (e.g., $CO_2$ if the disinfection fluid contains bicarbonate and is heated) to atmosphere via the filtered air vent.

In light of the disclosure set forth herein, and without limiting the disclosure in any way, in a first aspect of the present disclosure, which may be combined with any other aspect, or portion thereof, a peritoneal dialysis system includes a PD fluid pump; an airtrap; a fluid line extending from the airtrap; a fluid line valve positioned and arranged to operate with the fluid line; a gas line extending from an upper portion of the airtrap; a gas line valve positioned and arranged to operate with the gas line; and a control unit configured to cause the fluid line valve to close, the gas line valve to open, and the PD fluid pump to pump gas from the airtrap into the gas line after a patient drain to create a pocket of gas in the fluid line and push residual used PD fluid towards a drain line.

In a second aspect of the present disclosure, which may be combined with any other aspect, or portion thereof, the fluid line extends between the airtrap and the PD fluid pump.

In a third aspect of the present disclosure, which may be combined with any other aspect, or portion thereof, the gas line is connected fluidly to the fluid line.

In a fourth aspect of the present disclosure, which may be combined with any other aspect, or portion thereof, the PD system further includes at least one PD fluid line valve located upstream of the airtrap, wherein the PD fluid pump pulls gas from the airtrap, and wherein the control unit is further configured to open at least one of the at least one PD fluid line valve while pulling gas from the airtrap so that fresh PD fluid is pumped into the airtrap.

In a fifth aspect of the present disclosure, which may be combined with any other aspect, or portion thereof, the control unit is further configured to cause the fluid line valve to open, the gas line valve to close, and the PD fluid pump to pump fresh PD fluid from the airtrap into the fluid line to push the pocket of gas to in turn push the residual used PD fluid towards the drain line.

In a sixth aspect of the present disclosure, which may be combined with any other aspect, or portion thereof, the control unit is further configured to cause the PD fluid pump to pump the fresh PD fluid in a manner so as to preserve the pocket of gas.

In a seventh aspect of the present disclosure, which may be combined with any other aspect, or portion thereof, the PD system includes a level sensor operable with the airtrap, and wherein the control unit is further configured to monitor an output from the level sensor while the PD fluid pump is creating the pocket of gas.

In an eighth aspect of the present disclosure, which may be combined with any other aspect, or portion thereof, the control unit is configured to operate the PD fluid pump so that the pocket of gas has a predetermined volume.

In a ninth aspect of the present disclosure, which may be combined with any other aspect, or portion thereof, the predetermined volume is dependent on an amount of gas residing in the airtrap.

In a tenth aspect of the present disclosure, which may be combined with any other aspect, or portion thereof, gas residing in the airtrap comes from a sterilized or disinfected source.

In an eleventh aspect of the present disclosure, which may be combined with any other aspect, or portion thereof, the PD fluid pump is controlled by the control unit such that the air pocket tends to separate the residual used PD fluid from fresh PD fluid used to advance the air pocket.

In a twelfth aspect of the present disclosure, which may be combined with any other aspect, or portion thereof, the PD fluid pump is controlled by the control unit such that the air pocket tends to prevent mixing between the residual used PD fluid and fresh PD fluid used to advance the air pocket.

In a thirteenth aspect of the present disclosure, which may be combined with any other aspect, or portion thereof, the PD fluid pump is controlled by the control unit such that fresh PD fluid used to advance the air pocket has a laminar flow.

In a fourteenth aspect of the present disclosure, which may be combined with any other aspect, or portion thereof, a peritoneal dialysis ("PD") system includes a housing; a plurality of PD fluid supply lines extending from the housing; a plurality of disinfection connectors accessible at the housing, wherein a distal end of each of the supply lines is connected to one of the disinfection connectors to run a disinfection sequence; at least one bypass line extending between at least two of the plurality of disinfection connectors; and a filtered air vent placed in fluid communication with one of the at least one bypass line, such that the filtered air vent may be isolated from a patient during treatment.

In a fifteenth aspect of the present disclosure, which may be combined with any other aspect, or portion thereof, the filtered air vent includes a hydrophobic filter membrane.

In a sixteenth aspect of the present disclosure, which may be combined with any other aspect, or portion thereof, the PD system includes a control unit configured to cause air to be pulled in through the filtered air vent, the air pushing disinfection fluid towards a drain line after disinfection.

In a seventeenth aspect of the present disclosure, which may be combined with any other aspect, or portion thereof, the control unit is configured to cause the air to empty disinfection fluid from disinfected lines and components.

In an eighteenth aspect of the present disclosure, which may be combined with any other aspect, or portion thereof, the control unit is configured to cause the disinfected lines and components to be emptied as part of a startup procedure for a subsequent treatment, wherein the disinfected lines and components are further flushed with fresh PD fluid.

In a nineteenth aspect of the present disclosure, which may be combined with any other aspect, or portion thereof, any of the features, functionality and alternatives described in connection with any one or more of FIGS. 1 to 3 may be combined with any of the features, functionality and alternatives described in connection with any other of FIGS. 1 to 3.

In light of the above aspects and present disclosure set forth herein, it is an advantage of the present disclosure to provide a system for an automated peritoneal dialysis ("APD") cycler that helps to ensure that a particle load on a patient line filter of the system is maintained within the filter's particle load capacity.

It is another advantage of the present disclosure to provide a system for an APD cycler that helps to reduce the amount of fresh PD fluid needed for flushing, e.g., flushing used PD fluid or effluent after a patient drain.

It is a further advantage of the present disclosure to provide a system for an APD cycler that uses air or other gas (or a mixture thereof), which is naturally available.

It is yet another advantage of the present disclosure to provide a system for an APD cycler that provides filtered access to atmosphere, which may be used both for air intake and gas exhaust.

Additional features and advantages are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein and it is expressly contemplated to claim individual advantageous embodiments separately. Moreover, it should be noted that the language used in the specification has been selected principally for readability and instructional purposes, and not to limit the scope of the inventive subject matter.

DETAILED DESCRIPTION

Figure 1:
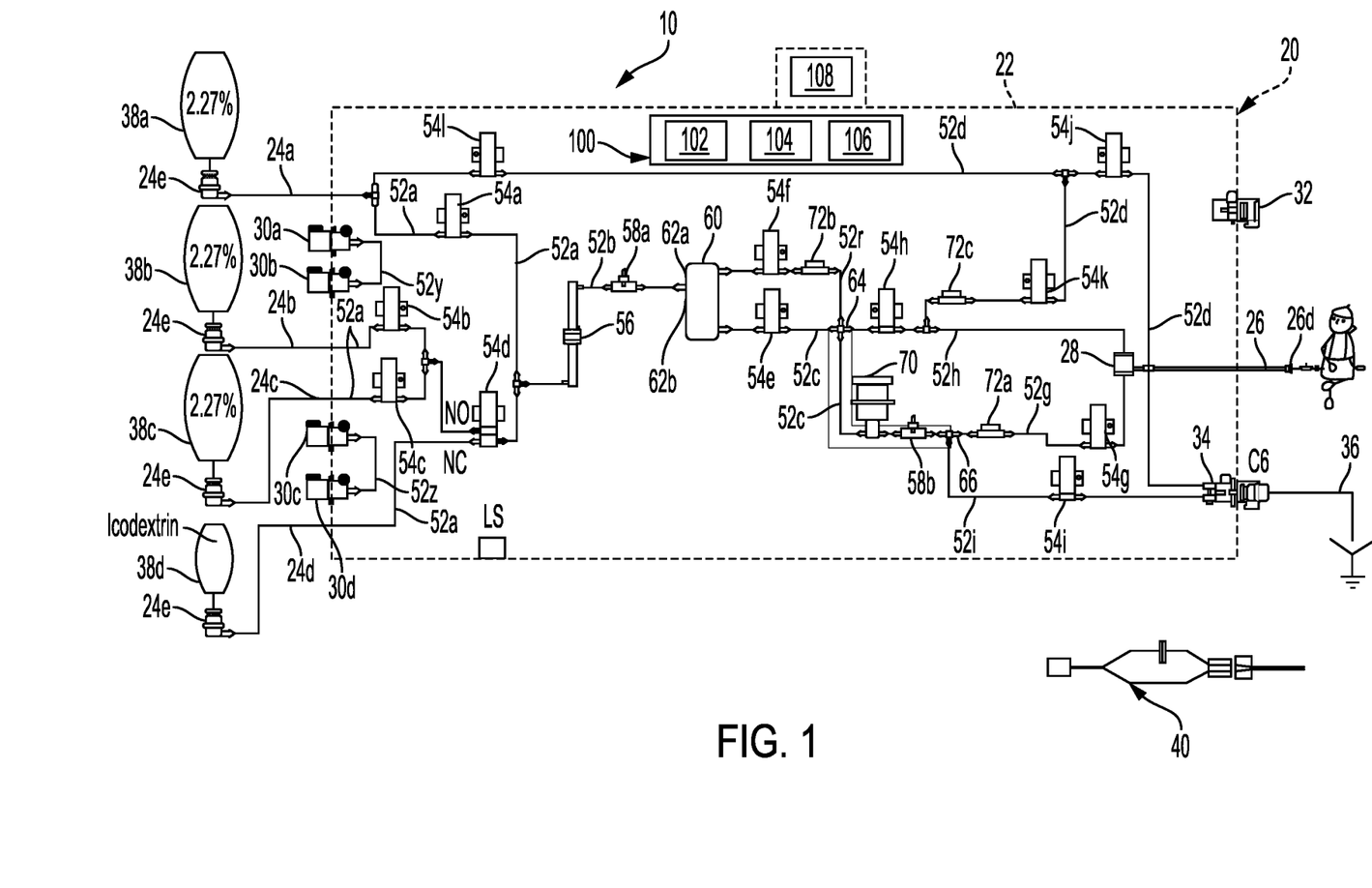
FIG. 1 is a schematic view of one embodiment of an automated peritoneal dialysis ("APD") machine or cycler and associated system of the present disclosure.

Referring now to the drawings and in particular to FIG. 1, automated peritoneal dialysis ("APD") system 10 and associated methodology of the present disclosure includes an APD machine or cycler 20. System 10 and cycler 20 attempt to eliminate disposable items as much as possible and instead provide the majority of its fluid carrying portions as reusable components, which are disinfected after treatment. Fluid lines within the machine or cycler are reused. In particular, FIG. 1 illustrates that cycler 20 includes a housing 22 from which reusable PD fluid supply lines 24a to 24d extend. FIG. 1 further illustrates that a reusable patient line 26 also extends from housing 22 of machine or cycler 20. Reusable patient line 26, which is typically longer than reusable PD fluid supply lines 24a to 24d, may be coiled or rolled up within the housing via a spool or hose reel 28 when reusable patient line 26 is not connected to a patient for treatment.

When not connected to PD fluid containers or bags, the reusable PD fluid supply lines 24a to 24d and patient line 26 can be connected to dedicated connectors supported and provided by the housing. The reusable PD fluid and patient lines may for example extend from a front of the housing and connect to connectors also provided at the front of the housing for ready access to the PD fluid and patient lines. In the illustrated embodiment, distal ends 24e of reusable PD fluid supply lines 24a to 24d releasably attach in a fluid-tight manner to disinfection connectors 30a to 30d, respectively, provided at housing 22. Distal end 26d of reusable patient line 26 releasably attaches in a fluid-tight manner to patient line connector 32 provided at housing 22. Disinfection connectors 30a to 30d and patient line connector 32 are configured to close or shut automatically when reusable PD fluid supply lines 24a to 24d and reusable patient line 26, respectively, are removed or not connected to the connectors.

FIG. 1 also illustrates that housing 22 provides a drain line connector 34, which may be releasably covered by a moveable, e.g., rotatable or slideable cover 34c. Drain line connector 34 receives a disposable drain line 36 for treatment, which may run to a drain container or bag or to a house drain. In an alternative embodiment, drain line 36 is reusable and is connected to a disinfection loop discussed herein.

FIG. 1 further illustrates that disposable PD fluid or solution containers or bags 38a to 38d are connected respectively to reusable PD fluid supply lines 24a to 24d. Distal ends 24e of reusable PD fluid supply lines 24a to 24d may be color coded and/or keyed to match a colored or keyed connector of a dedicated PD fluid container or bag 38a to 38d. The containers or bags may hold the same or different dextrose or glucose level PD fluids, such as 1.36% glucose PD fluid, 2.27% glucose PD fluid and/or a last bag of a different formulation of PD fluid, such as icodextrin.

It should be appreciated that any number of reusable PD fluid lines and PD fluid containers or bags may be provided, including a single reusable PD fluid line and PD fluid container or more than one reusable PD fluid lines and PD fluid containers. In a further alternative embodiment, PD fluid containers or bags 38*a* to 38*d* are replaced by an online PD fluid generation source, which connects to and communicates fluidly with a single reusable PD fluid line.

Besides disposable drain line 36 (and associated container if used) and disposable PD fluid containers or bags 38*a* to 38*d*, it is contemplated that in one embodiment, the only other disposable component of system 10 is a disposable filter set 40 removably connected by the patient at the distal end 26*d* of reusable patient line 26 to provide a final stage of PD fluid filtration prior to delivery to the patient. In an embodiment, disposable filter set 40 is spliced between the distal end 26*d* of reusable patient line 26 and the patient's transfer set, which leads to an indwelling PD catheter inserted into the patient.

It is contemplated that any one, or more, or all of reusable PD fluid supply lines 24*a* to 24*d*, reusable patient line 26, disinfection connectors 30*a* to 30*d*, patient line connector 32, drain line connector 34, drain line 36, PD fluid containers or bags 38*a* to 38*d* and patient line filter set 40 to be made of any one or more plastic, e.g., polyvinylchloride ("PVC") or a non-PVC material, such as polyethylene ("PE"), polyurethane ("PU"), polypropylene ("PP"), polycarbonate ("PC") or polyether ether ketone ("PEEK").

FIG. 1 further illustrates that reusable supply tubing 52*a* runs from each reusable PD fluid supply line 24*a* to 24*d*, through a PD fluid line valve 54*a* to 54*d*, respectively, to a PD fluid inline heater 56. In an embodiment, each of the valves of the APD cycler 20, including PD fluid line valves 54*a* to 54*d*, is an electrically actuated valve having a reusable valve body that occludes (e.g., when unpowered for fail safe operation) or allows (e.g., when powered) PD fluid to flow through the body. In the illustrated embodiment, valve 54*d* is a three-way valve having a normally open port for receiving PD fluid from reusable PD fluid supply line 24*b* or 24*c* and a normally closed port for receiving PD fluid from reusable PD fluid supply line 24*d*. PD fluid inline heater 56 is also electrically actuated in one embodiment and is, for example, a resistive heater having a reusable heater body that accepts PD fluid for treatment and disinfection heating. Inline heater 56 in an embodiment is able to heat PD fluid from room temperature or colder (e.g., if the PD fluid is stored in a cold environment) to body temperature, e.g., 37° C., at a flowrate of up to at least 200 milliliters ("ml")/minute.

A first temperature sensor 58*a* is located adjacent to heater 56, e.g., downstream from the heater to provide feedback for temperature control. If desired, a second temperature sensor (not illustrated) may be provided upstream from heater 56 to enable the incoming temperature of fresh PD fluid to be taken into account for the heating algorithm. A second temperature sensor 58*b* is illustrated just downstream from PD fluid pump 70, which is provided for example as a second check that fresh PD fluid exiting PD fluid pump 70 is at a desired temperature for treatment, e.g., body temperature or 37° C.

Reusable tubing 52*b* runs from the outlet of PD fluid inline heater 56 to an airtrap 60 in the illustrated embodiment of FIG. 1. Any of the reusable tubing inside the housing of cycler 20, including reusable tubing 52*a* and 52*b*, may be made of metal, e.g., stainless steel or plastic, e.g., polyvinylchloride ("PVC") or a non-PVC material, such as polyethylene ("PE"), polyurethane ("PU"), polypropylene ("PP"), polycarbonate ("PC") or polyether ether ketone ("PEEK"). In an embodiment, one or more level sensor 62*a* and 62*b* is located adjacent airtrap 60 so that a desired level or range of levels of PD fluid is/are maintained in the airtrap. A fluid line valve 54*e* is located downstream from airtrap 60 in the illustrated embodiment and operates in cooperation with a gas line valve 54*f* as discussed herein. Airtrap 60 if provided with a filtered air vent to draw in filtered air may be closed upstream by PD fluid line valves 54*a* to 54*d* to drain the airtrap when dictated by the output of level sensor 62*a* or 62*b*.

A reusable fluid line 52*c* and a gas line 52*r* run between fluid line valve 54*e* and gas line valve 54*f*, respectively, and a PD fluid pump 70 located within housing 22 of cycler 20. Gas line 52*r* as illustrated extends from an upper portion of airtrap 60. PD fluid pump 70 includes a reusable pump body that accepts (i) PD fluid for treatment and priming, (ii) air for reasons discussed herein, and (iii) at certain times a mixture of PD fluid and air when present. That is, pump 70 does not require the PD fluid to flow within a disposable item, such as a tube or cassette. The reusable pump body of pump 70 itself accepts the PD fluid. PD fluid pump 70 may be of a type, e.g., piston pump, which is inherently accurate so that a separate PD fluid volume measurement apparatus, such as a balance chamber or flowmeter, is not needed. PD fluid pump 70 may alternatively be a different type of self-priming, inherently accurate pump. PD fluid pump 70 is controllable to pump to and from the patient at or below a pressure limit by controlling a level of current to the PD fluid pump. A positive patient pressure limit may for example be one to five psig (e.g., two psig (14 kPa)). A negative patient pressure limit may for example be −1.0 psig to −3.0 psig (e.g., −1.3 psig (−9 kPa)). Pump 70 is also capable of supplying lower pressures if needed, e.g., for small children or babies. PD fluid pump 70 is bidirectional and continuous in one embodiment, such that a single pump may be provided.

FIG. 1 further illustrates that a fresh PD fluid patient line valve 54*g* is located in an embodiment along reusable fresh PD fluid patient tubing or line 52*g* between downstream temperature sensor 58*b* and spool or hose reel 28. Fresh PD fluid patient tubing or line 52*g* communicates fluidly with a fresh PD fluid lumen of dual lumen reusable patient line 26 in one embodiment. A used PD fluid patient line valve 54*h* is located in an embodiment along reusable used PD fluid patient tubing or line 52*h* between PD fluid pump 70 (via cross 64) and spool or hose reel 28. Used PD fluid patient tubing or line 52*h* communicates fluidly with a used PD fluid lumen of dual lumen reusable patient line 26 in one embodiment. A drain line valve 54*i* is located in an embodiment along reusable drain tubing or line 52*i* between downstream temperature sensor 58*b* and drain line connector 34.

A first patient pressure sensor 72*a* is located along fresh PD fluid patient tubing or line 52*g* between PD fluid pump 70 and spool or hose reel 28 to measure positive patient PD fluid pressure. A second patient pressure sensor 72*b* is located along gas line 52*r* to measure the pressure of any gas residing within airtrap 60. A third pressure sensor 72*c* is located along reusable disinfection tube or line 52*d* and is positioned to measure the negative pressure of used PD fluid returning from the patient to PD fluid pump 70.

As discussed above, patient line connector 32 is located at APD cycler housing 22 and accepts dual lumen reusable patient line 26 during disinfection and generally while the patient is not undergoing treatment. Patient line connector 32 in one embodiment includes a sealed fluidic U-turn or 180 degree turn that allows disinfection fluid, e.g., heated PD fluid, to flow from one lumen of the dual lumen patient line to another lumen of the dual lumen patient line. The sealed fluidic U-turn or 180 degree turn may be provided as a cap portion of reusable patient line connector 32, which may be tethered to or releasable from the remainder of patient line connector 32. Dual lumen reusable patient line 26 is thereby included in the disinfection loop.

As further discussed above, drain line 36 is disposable in one embodiment and connects to drain line connector 34 extending from housing 22 of APD cycler 20 during treatment. After treatment, drain line 36 is removed and discarded, while drain line connector 34 is sealed shut. Drain line connector 34 also includes a sealed fluidic U-turn or 180 degree turn that allows disinfection fluid, e.g., heated PD fluid, to flow from reusable drain tubing or line 52i into one of a plurality of reusable disinfection tubes or lines 52d, or vice versa. Reusable disinfection tubes or lines 52d as illustrated in FIG. 1 extend to (i) reusable used PD fluid patient tubing or line 52h via disinfection valves 54j and 54k and (ii) reusable supply tubing 52a via disinfection valves 54j and 54l. Reusable disinfection tubes or lines 52d form an overall disinfection loop that allows disinfection fluid, e.g., heated PD fluid, to reach all desired disinfection locations (i) within cycler 20, and (ii) within reusable PD fluid supply lines 24a to 24d and reusable dual lumen patient line 26 located outside of cycler 20. Disinfection valves 54j, 54k and 54l are sequenced during disinfection as needed to control disinfection fluid flow direction.

FIG. 1 further illustrates that APD cycler 20 of system 10 of the present disclosure includes a control unit 100 having one or more processor 102 and one or more memory 104 that receive, store and process signals or outputs from the pressure sensors 72a to 72c, temperature sensors 58a and 58b and possibly a conductivity sensor (not illustrated). Control unit 100 uses pressure feedback from pressure sensors 72a and 72b to control PD fluid pump 70 to pump fresh and used PD at safe patient and system pressure limits. Control unit 100 uses temperature feedback from temperature sensor 58a to control inline PD fluid heater 56 to heat the fresh PD fluid to, e.g., body temperature or 37° C.

Control unit 100 also opens and closes PD fluid valves 54a to 54l in combination with the operation of PD fluid pump 70 and heater 56 to run a priming sequence, multiple patient fill sequences, multiple patient drain sequences, and a disinfection sequence after a PD treatment. In the disinfection sequence, each reusable PD fluid supply line 24a to 24d is connected to a respective disinfection connector 30a to 30d, respectively, reusable patient line 26 is connected to reusable patient line connector 32, and drain line connector 34 is covered or capped by its integral cover 34. The disinfection sequence readies APD cycler 20 for the next treatment. In an embodiment, remaining fresh PD fluid is heated after the final drain and is used as the disinfection fluid for disinfection.

Control unit 100 as illustrated in FIG. 1 also includes a video controller 106 that interfaces with a user interface 108, which may include a display screen operating with a touchscreen and/or one or more electromechanical button, such as a membrane switch. User interface 108 may also include one or more speaker for outputting alarms, alerts and/or voice guidance commands. User interface 108 may be provided with cycler 20 as illustrated in FIG. 1 and/or be a remote user interface operating with control unit 100. Control unit 100 may also include a transceiver (not illustrated) and a wired or wireless connection to a network, e.g., the internet, for sending treatment data to and receiving prescription instructions from a doctor's or clinician's server interfacing with a doctor's or clinician's computer.

In an embodiment, control unit 100 after a patient drain has been completed causes gas line valve 54f to open, fluid line valve 54e to close and PD fluid pump 70 to pull a small amount (e.g., 0.5 ml) of air, or whatever gas (or mixture) resides at the top of airtrap 60, from the top of airtrap 60. PD fluid pump 70 may be operated for one or more pump stroke(s) to pull the desired volume of gas. Control unit 100 also causes drain line valve 54i to open and for PD fluid pump 70 to push the air bubble through reusable fluid line 52c towards drain line connector 34. The moving bubble causes residual effluent or drain fluid from a prior patient drain to be pushed towards drain line connector 34 and the house or container drain.

To increase the amount of effluent or leftover drain fluid, it is contemplated to cause control unit 100 to operate PD fluid pump 70 with gas line valve 54f open and fluid line valve 54e closed so as to sequence a plurality of small volume air pockets (e.g., 0.5 ml), each pushing a volume of effluent or leftover drain fluid towards drain. Alternatively, control unit 100 may be programmed to operate PD fluid pump 70 with gas line valve 54f open and fluid line valve 54e closed so as to pull and push a larger volume air pocket (e.g., 5 to 10 ml) from airtrap 60, which in turn pushes a larger volume of leftover effluent or used PD fluid towards drain. The amount of air or gas pulled and used to form the one or more air pocket in an embodiment depends on the amount of air or gas available within airtrap 60. Regardless of the volume of the one or more air pocket, a goal of system 10 of the present disclosure is to reduce the amount of mixing between fresh and used PD fluid, which in turn reduces the amount of fresh PD fluid needed for flushing reusable lines, such as the portion of line 52c carrying used PD fluid to drain and drain line 52i. For certain types of APD especially, such as tidal flow APD, there can be many patient fills and drains, causing the needed amount of fresh PD fluid for flushing to accumulate to a significant value. The air pocket(s) act(s) as a barrier(s) between fresh and used PD fluid, limiting the mixing of same.

In any of the above air removal and air pocket formation embodiments, it is contemplated for control unit 100 to open one or more PD fluid line valve 54a to 54d to allow a like volume of fresh PD fluid to enter airtrap 60 while the air pocket(s) is/are removed from the airtrap so as not to create a negative pressure in the airtrap. In any of the above air removal and air pocket formation embodiments, it is also contemplated for control unit 100 to monitor the output from upper level sensor 62a to ensure that no fresh PD fluid is pulled from airtrap 60 into gas line 52r. If air is not detected at upper level sensor 62a (fluid is detected) while an ongoing air pocket formation is taking place, control unit 100 in an embodiment causes gas line valve 54f to close, fluid line valve 54e to open and PD fluid pump 70 to flush instead using fresh PD fluid. In an alternative embodiment, control unit 100 is programmed to attempt to pull air from the top of airtrap 60 regardless of the reading at upper level sensor 62a (which may or may not be taken prior to opening gas line valve 54f.

It should be appreciated that the air pockets may be used to flush alternative or additional fluid lines in addition to drain line 36. The system 10 may use the air pockets to flush patient line 26, PD fluid supply lines 24a to 24d, and/or line 52d, for example. Control unit 100 may be configured to open one or more valve 54a to 54l to direct the air pocket(s) to the desired patient line 26, PD fluid supply lines 24a to 24d, and/or line 52d.

Figure 2:
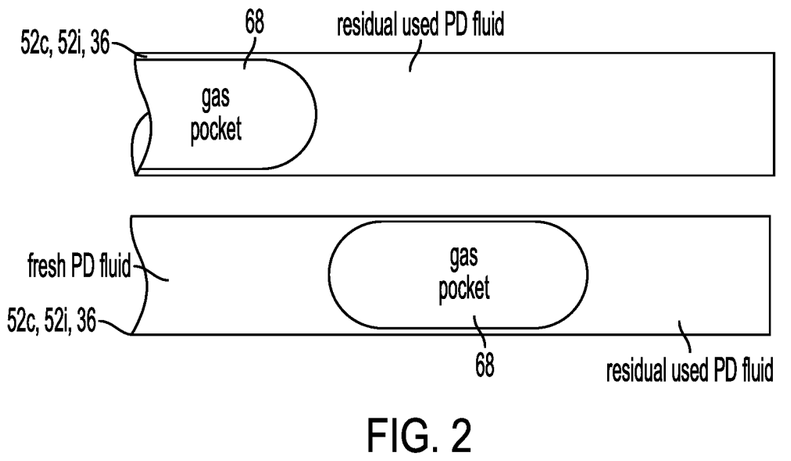
FIG. 2 is a sectioned elevation illustrating an embodiment of a gas pocket of the present disclosure traveling through a fluid tube.

Referring now to FIG. 2, after the formation and introduction of the one or more air pocket, control unit 100 causes gas line valve 54f to close, fluid line valve 54e to open, one or more PD fluid line valve 54a to 54d to open (if not already open), and causes PD fluid pump 70 to push the one or more gas pocket 68 towards drain line connector 34, thereby pushing residual effluent or used PD fluid into drain line 36 and house or container drain. An important line to clear of residual used PD fluid or effluent is reusable fluid line 52c located between cross 64, located upstream of PD fluid pump 70, and a tee 66, located downstream from PD fluid pump 70. FIG. 2 illustrates a gas pocket 68 (e.g., air, $CO_2$ or a mixture thereof) at different points in time flowing along a line, such as reusable fluid line 52c, reusable drain tubing or line 52i, or flexible, e.g., disposable, drain line 36. In the illustrated embodiment, fresh PD fluid is located upstream of gas pocket 68, while residual used PD fluid or effluent is located downstream from gas pocket 68.

It is contemplated for control unit 100 to cause PD fluid pump to pump the fresh PD fluid pushing gas pocket 68 at a slow speed, e.g., 100 ml/min or less, to create a laminar fluid flow that tends not to disrupt the formation of gas pocket 68. The pump speed in an embodiment may be chosen to create a Reynolds number below 2300 so that fluid flow remains in the laminar flow area. Running PD fluid pump 70 at even 200 ml/min and assuming the relevant reusable tubing to be two mm inner diameter, results in a Reynolds number of about 950, which is well below the 2300 laminar limit (tubing diameter may be larger, e.g., four mm inner diameter, and still remain laminar at 200 ml/min flowrate). FIG. 1 illustrates however that the reusable tubing involves multiple component connections and turns, etc., which tend to make PD fluid flow more turbulent. Nevertheless, running PD fluid pump 70 at a flowrate of 50 to 100 ml/min for the air pocket flushing described herein, for example, will likely yield a highly laminar PD fluid flow.

Figure 3:
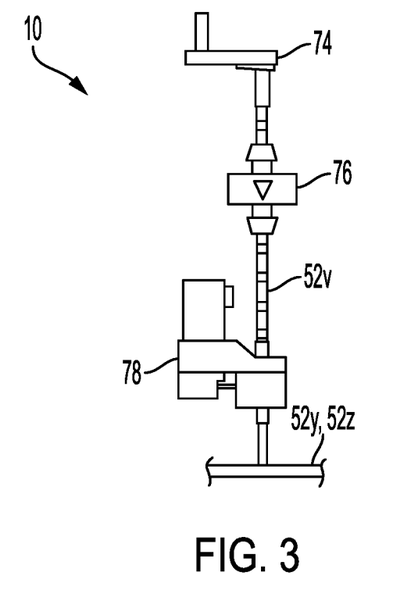
FIG. 3 is an elevation view of a filtered air vent and a vent line for use with the cycler and associated system illustrated in FIG. 1.

Referring now to FIG. 3, an alternative embodiment for system 10 of the present disclosure is illustrated. It should be appreciated that system 10 in FIG. 1 is closed to atmosphere, meaning that gas collected at the top of airtrap 60 comes from a sterilized location, likely from a PD fluid container or bag 38a to 38d, or perhaps as a byproduct from disinfection (e.g., $CO_2$ if the disinfection fluid contains bicarbonate and is heated). Gas in the embodiment of FIG. 1 or 2 is accordingly safe from the standpoint that it should not promote microbial growth.

In FIG. 3 it is contemplated to add a filtered air vent 74 at the end of a vent line 52v, which allows air to be pulled in from the atmosphere and potentially allows unwanted gases (e.g., $CO_2$, air or a mixture thereof) to be vented to atmosphere. Filtered air vent 74 in an embodiment includes a hydrophobic filter membrane, e.g., a 0.2 micron filter, configured to sterile filter any ambient air entering through filtered air vent 74. A one-way valve or check valve 76 may be located in vent line 52v to prevent PD fluid from reaching filtered air vent 74. A solenoid vent valve 78 under control of control unit 100 may also be located along vent line 52v to selectively allow filtered air to be taken into system 10. When filtered air vent 74 is connected to a fluid line, the valve 78 may include a three-way valve that permits selective access to air. In one embodiment, the three-way valve 78 is connected along a fluid line between airtrap 60 and gas line valve 54f.

The filter membrane associated with disposable filter set 40 is a hydrophilic membrane that is likewise of a sterilizing grade. It is placed in the reusable patient line 26 communicating with the patient but is discarded and replaced after each treatment. Filtered air vent 74 on the other hand is used over multiple treatments, e.g., replaced on a service interval, such that it presents more of a microbial risk than the filter membrane associated with disposable filter set 40. It is accordingly contemplated to communicate a vent line 52v leading to filtered air vent 74 with a fluid location of system 10 that is not part of the patient circuit during treatment, either for a patient fill or a patient drain. System 10 of FIG. 1 illustrates a few possible locations to which air vent 74 may be connected. For example, air vent 74 via vent line 52v may be connected to bypass lines 52y and 52z extending between disinfection connectors 30a and 30b and 30c and 30d, respectively. Bypass lines 52y or 52z as illustrated in FIG. 1 are isolated during treatment and have no possible fluidic connection to the patient.

It is not until disinfection between PD treatments occurs that bypass lines 52y or 52z are brought into the disinfection loop by the connection of distal ends 24e of reusable PD fluid supply lines 24a to 24d in a fluid-tight manner with disinfection connectors 30a to 30d. Here, any pathogens that could possibly breach the filter membrane of filtered air vent 74 are killed via the disinfection procedure.

In another embodiment, filtered air vent 74 is placed in fluid communication with one of the disinfection connectors 30a to 30d or one of the plurality of PD fluid supply lines 24a to 24d. In some instances, filtered air vent 74 is placed in fluid communication with reusable supply tubing 52a or PD fluid pump 70.

In a further embodiment, filtered air vent 74 via vent line 52v may be connected to airtrap 60. Filtered air vent 74 may be used to pull atmospheric air into system 10 when system 10 is not configured to receive sterilized gas. In these embodiments, filtered air vent 74 is fluidly coupled to a top of airtrap 60 or integrally formed with airtrap 60.

It is contemplated for control unit 100 of system 10 to open and sequence the valves as necessary and to cause PD fluid pump 70 to pull filtered air in through filtered air vent 74, e.g., at the end of the disinfection sequence to drive the disinfection fluid to drain. Such air could be heated by inline heater 56 to help dry the disinfected reusable tubing of cycler 20 and system 10. Control unit 100 may alternatively or additionally be used to open and sequence the valves as necessary and to cause PD fluid pump 70 to push gases formed during disinfection (e.g., $CO_2$ if the disinfection fluid contains bicarbonate and is heated) to atmosphere via filtered air vent 74.

As discussed above, it is contemplated to provide airtrap 60 with a filtered air vent (one-way valve 76 and solenoid valve 78 under control of control unit 100 may also be provided). Here, because the filtered air vent 74 is in valved fluid communication with airtrap 60 used during treatment, or even in the case of filtered air vent 74 connected to bypass lines 52y and 52z, it is contemplated for control unit 100 after disinfection to cause the reusable fluid lines and components of PD machine or cycler 20 of system 10 to be emptied of fluid either at the end of treatment or at the beginning of a startup procedure for a new treatment. Any unintentional bacteria or pathogens pulled into the reusable lines (e.g., due to a compromised filter at vent 74) are accordingly flushed to drain. Such emptying at the end of treatment removes the bacteria or pathogens desirably as soon as possible. Such emptying at the start of new treatment allows the bacteria or pathogens to be further flushed with new, fresh PD fluid.

It should be understood that various changes and modifications to the presently preferred embodiments described herein will be apparent to those skilled in the art. It is The invention is claimed as follows:

1. A peritoneal dialysis ("PD") system comprising:
 a PD fluid pump;
 an airtrap;
 a fluid line extending from the airtrap;
 a fluid line valve positioned and arranged to operate with the fluid line;
 a gas line extending from an upper portion of the airtrap;
 a gas line valve positioned and arranged to operate with the gas line; and
 a control unit configured to cause the fluid line valve to close, the gas line valve to open, and the PD fluid pump to pump gas from the airtrap into the gas line after a patient drain to create a pocket of gas in the fluid line and push residual used PD fluid towards a drain line.

2. The PD system of claim 1, wherein the fluid line extends between the airtrap and the PD fluid pump.

3. The PD system of claim 1, wherein the gas line is connected fluidly to the fluid line.

4. The PD system of claim 1, further comprising at least one PD fluid line valve located upstream of the airtrap, wherein the PD fluid pump pulls gas from the airtrap, and wherein the control unit is further configured to open at least one of the at least one PD fluid line valve while pulling gas from the airtrap so that fresh PD fluid is pumped into the airtrap.

5. The PD system of claim 1, wherein the control unit is further configured to cause the fluid line valve to open, the gas line valve to close, and the PD fluid pump to pump fresh PD fluid from the airtrap into the fluid line to push the pocket of gas to in turn push the residual used PD fluid towards the drain line.

6. The PD system of claim 5, wherein the control unit is further configured to cause the PD fluid pump to pump the fresh PD fluid in a manner so as to preserve the pocket of gas.

7. The PD system of claim 1, further including a level sensor operable with the airtrap, wherein the control unit is further configured to monitor an output from the level sensor while the PD fluid pump is creating the pocket of gas.

8. The PD system of claim 1, wherein the control unit is configured to operate the PD fluid pump so that the pocket of gas has a predetermined volume.

9. The PD system of claim 8, wherein the predetermined volume is dependent on an amount of gas residing in the airtrap.

10. The PD system of claim 1, wherein gas residing in the airtrap comes from a sterilized or disinfected source.

11. The PD system of claim 1, wherein the PD fluid pump is controlled by the control unit such that the gas pocket tends to separate the residual used PD fluid from fresh PD fluid used to advance the air pocket.

12. The PD system of claim 1, wherein the PD fluid pump is controlled by the control unit such that the gas pocket tends to prevent mixing between the residual used PD fluid and fresh PD fluid used to advance the air pocket.

13. The PD system of claim 1, wherein the PD fluid pump is controlled by the control unit such that fresh PD fluid used to advance the gas pocket has a laminar flow.

14. The PD system of claim 1, wherein the pocket of gas in the fluid line includes a sequence of pockets of the gas in the fluid line.

* * * * *